Patented Feb. 27, 1951

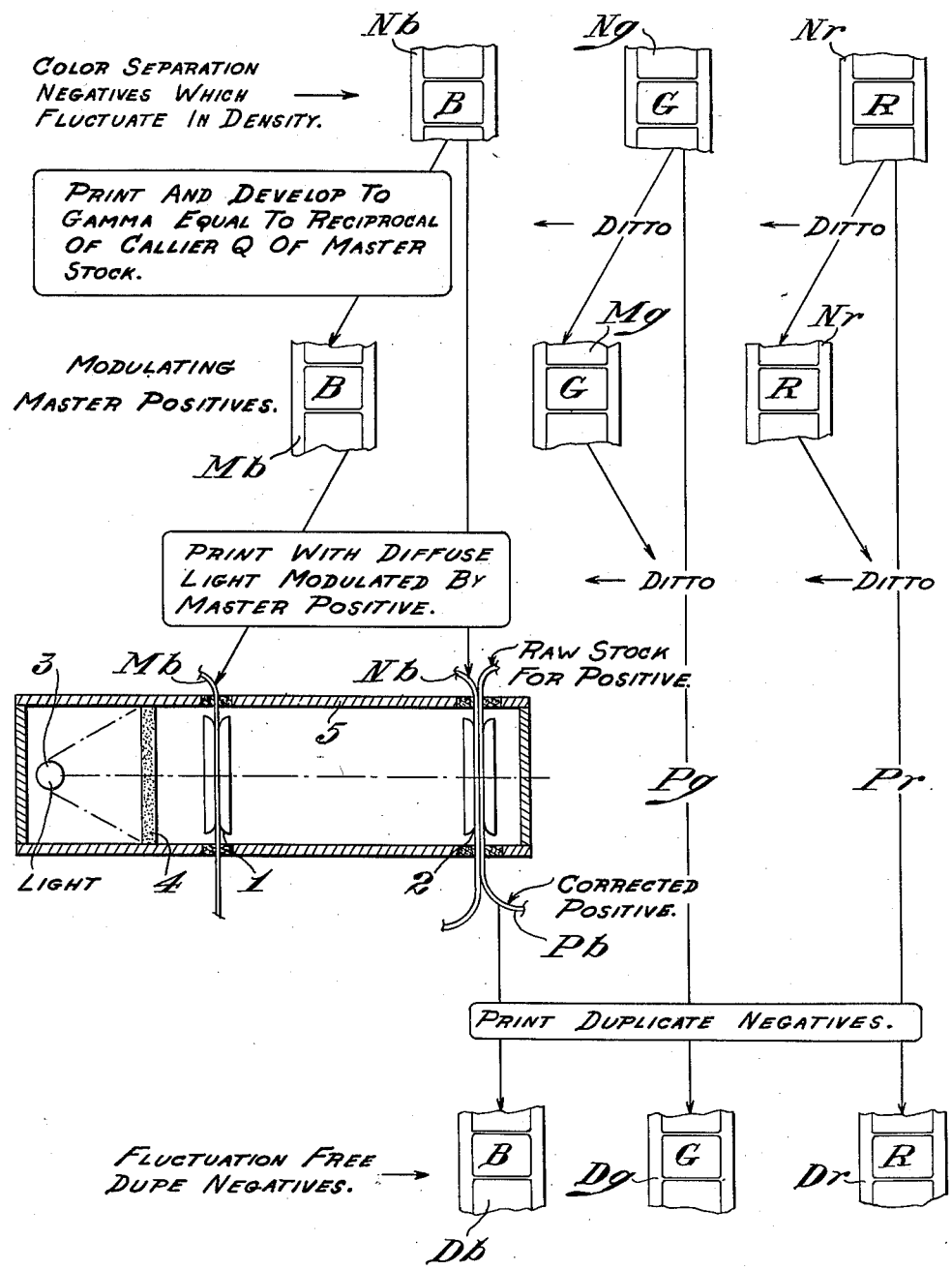

2,543,706

UNITED STATES PATENT OFFICE 2,543,706

METHOD OF COUNTERACTING AVERAGE DENSITY FLUCTUATION IN MOTION PICTURES

Wadsworth E. Pohl, Los Angeles, Calif., assignor to Technicolor Motion Picture Corporation, Hollywood, Calif., a corporation of Maine Application September 30, 1948, Serial No. 51,982

4 Claims. (Cl. 95—5)

In making motion pictures the average density of the pictures often fluctuates from frame to frame. This fluctuation may be caused by any one or more variable factors in the exposing and developing processes. For example, while the scene is being photographed the illumination may vary or mechanical or electrical trouble may develop in the camera, and while the negative passes through the developing machine the speed of the negative or the strength of the developer may vary. The resulting fluctuations in the negatives are reproduced in the positives and cause undesirable flicker on the screen when the pictures are projected.

Objects of the present invention are to counteract the effects of the aforesaid fluctuations and to produce motion picture positives which are substantially flicker-free.

According to the present invention a master positive is made from the negative film before printing the positive film to be projected on the screen and then the positive stock or photosensitive film is printed from the negative film with light transmitted through the master positive and uniformly distributed throughout the area of the printing aperture, the light for each frame of the positive passing through the corresponding frame of the master positive. Thus the printing light is automatically increased or decreased from frame to frame, the increase or decrease being in the right direction to counteract the aforesaid fluctuation. For example in a frame in which the average density of the negative is too high because of the aforesaid fluctuation the master positive will be less dense than it otherwise would be; consequently the printing light coming through the master positive is somewhat more intense, thereby counteracting the excess average density of the negative. Conversely in a frame in which the average density of the negative is less than normal, the density of the master positive is greater than normal, and in printing the positive the printing light is thus automatically reduced to compensate for the under density of the negative.

An important aspect of the invention is that the light passing through the master positive in the printing operation be diffused substantially uniformly throughout the area of the printing aperture, thereby to avoid printing the master-positive image on the positive film. While the printing light may be diffused either before or after it passes through the master positive, it is preferably diffused before passing through the master positive. While the present invention may be used to advantage with only a part of the printing light passing through the master positive, to obtain the full benefit all of the printing light should pass through the master positive.

In a more specific aspect the invention involves the development of the master positive to a gamma approximately equal to the reciprocal of the Callier Q of the master stock on which the master positive is to be printed, thereby completely to counteract the aforesaid fluctuations.

The expression "Callier Q" is defined by Neblette, "Photography," 4th ed., page 407, as follows:

"The ratio of the diffuse to the specular density is frequently termed Callier's factor after A. Callier who was the first to investigate the scatter of light by photographic negatives. It is sometimes referred to as Q which was the symbol employed by Callier for $D_{||}/D_{\#}$."

Other references to Callier's coefficient are found in "The Principles of Optics" by Hardy and Perrin, 1st ed., page 212, Journal of the Optical Society of America, vol. 12, 559 (1926); and Photographic Journal, vol. 49, 200 (1909). The Callier coefficient is taken into account because it determines the effect of the light transmitted by the master positive. The sum total of the light transmitted by the master positive and the negative in printing the corrected positive must be identical from frame to frame to eliminate the undesirable fluctuations, and only by adjusting the contrast of the master positive in accordance with the Callier coefficient is this possible.

In the preferred embodiment of the invention the master positive is fed through one aperture and the positive and negative are fed in contact with each other through another aperture which is in spaced alignment with the first aperture.

For the purpose of illustration one embodiment of the invention is shown in the accompanying drawings, the angle figure comprising a diagram of the process as applied to three-color photography.

In the drawings the three color-separation negatives representing the blue, green and red aspects of a scene are designated $Nb$, $Ng$ and $Nr$. $Mb$, $Mg$, $Mr$ represent the master positives printed from the negatives and from which are printed the fluctuation-free positives $Pb$, $Pg$ and $Pr$. While the latter may be used for projection purposes, ordinarily they are used to make dupe negative from which the final prints are made.

As indicated in the drawing, a master positive is printed from each of the negatives and developed to a gamma equal to the reciprocal of the Callier Q of the master stock. Then these master positives are used with the negatives in a two-aperture printer to print corrected positives. Thus in the diagram the master positive Mb is fed through aperture 1 in optical alignment with the aperture 2 through which the negative Nb and the positive stock Pb are fed. The printing light from source 3 passes through a diffusing plate 4 thence through the first aperture and thence through the second aperture. The parts are enclosed in a light-tight casing 5 so that all of the printing light reaching the second aperture is the diffused light from the diffusing plate 4. Each of the other two corrected positives Pg and Pr are printed in the same way from the negatives Ng and Nr with diffuse light from the master positives Mg and Mr respectively. The corrected positives Pb, Pg and Pr are then used to print the dupe negatives Db, Dg and Dr in the usual way.

As explained above this method of printing the positives Pb, Pg and Pr counteracts all of the undesirable fluctuations in the density of succeeding frames. Consequently both the positives and the dupe negatives printed therefrom are fluctuation-free.

It should be understood that the present disclosure is for the purpose of illustration only and that this invention includes all modifications and equivalents which fall within the scope of the appended claims. For example instead of using master positives to print corrected positives, master negatives could be used to print corrected negatives. Thus it will be understood that the appended claims are intended to cover the printing of corrected negatives with master negatives as well as printing corrected positives with master positives.

I claim:

1. In the art of printing motion pictures on a photosensitive film from a negative film in which the density fluctuates from frame to frame, the method of counteracting the fluctuation which comprises photographically producing a master positive from said negative film and then printing onto said photosensitive film from the negative film with light transmitted through said master positive and uniformly diffused throughout the area of the negative, the light for each frame of the photosensitive film passing through the corresponding frame of the negative and the master positive.

2. The method according to claim 1 further characterized in that the master positive is developed to a gamma approximately equal to the reciprocal of the Callier Q of the master stock.

3. The method according to claim 1 further characterized in that substantially all of the light reaching the negative passes through the master positive.

4. The method according to claim 1 further characterized in that said light is diffused when it falls on the master positive.

WADSWORTH E. POHL.

REFERENCES CITED

The following references are of record in the file of this patent:

UNITED STATES PATENTS

| Number | Name | Date |
|---|---|---|
| 1,808,743 | Barkelew | June 9, 1931 |
| 2,420,636 | Yule | May 13, 1947 |
| 2,455,849 | Yule | Dec. 7, 1947 |

FOREIGN PATENTS

| Number | Country | Date |
|---|---|---|
| 380,647 | Great Britain | Sept. 22, 1932 |